P. C. HEWITT.
REGULATION OF ELECTRICAL DISTRIBUTION SYSTEMS.
APPLICATION FILED MAR. 17, 1903.
1,197,628.
Patented Sept. 12, 1916.
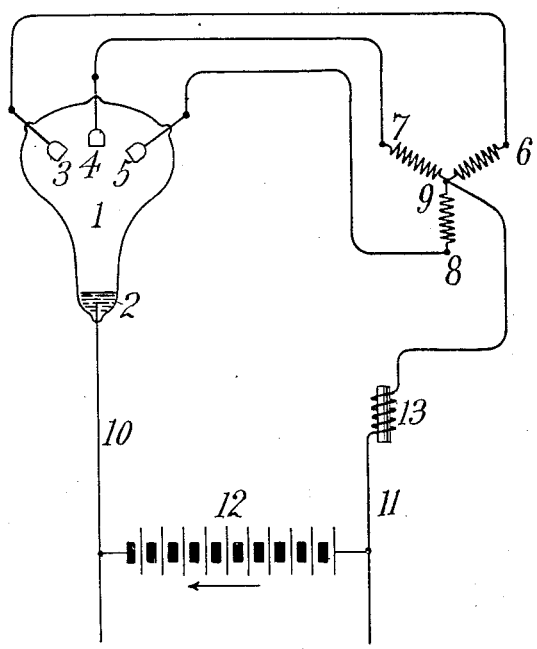
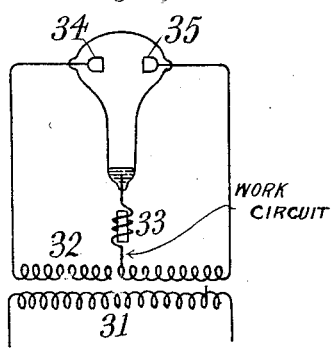
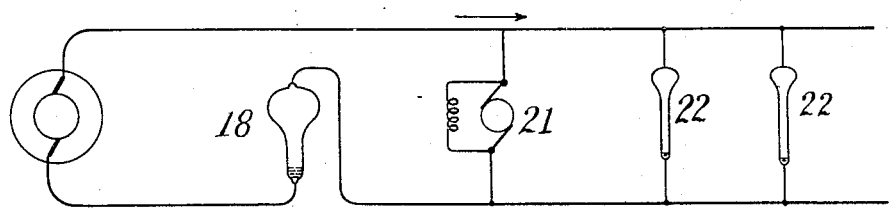
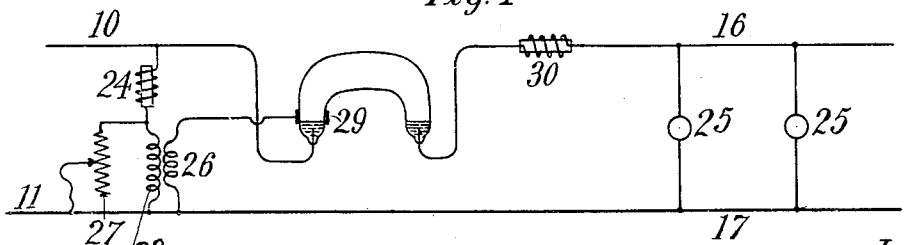
Witnesses:
Inventor
Peter Cooper Hewitt
by Charles A. Terry, Atty

UNITED STATES PATENT OFFICE.

PETER COOPER HEWITT, OF NEW YORK, N. Y., ASSIGNOR, BY MESNE ASSIGNMENTS, TO COOPER HEWITT ELECTRIC COMPANY, OF HOBOKEN, NEW JERSEY, A CORPORATION OF NEW JERSEY.

REGULATION OF ELECTRICAL DISTRIBUTION SYSTEMS.

1,197,628.   Specification of Letters Patent.   Patented Sept. 12, 1916.

Application filed March 17, 1903. Serial No. 148,173.

*To all whom it may concern:*

Be it known that I, PETER COOPER HEWITT, a citizen of the United States, and resident of New York, county of New York, State of New York, have invented certain new and useful Improvements in Regulation of Electrical Distribution Systems, of which the following is a specification.

The invention forming the subject of this specification relates generally to means for storing energy during the normal operation of an electrical distribution system and discharging all or a part of the stored energy at the proper time when for any reason the supplied energy falls below the condition of efficient operation.

In carrying the invention into effect, I generally make use of the properties of my vapor converter or analogous apparatus, as will be seen by reference to the drawings and the subsequent part of this specification.

The invention is applicable to many kinds of electrical distribution, examples of which are illustrated in the accompanying drawings in which—

Figures 1, 2, 3, 4, 5 and 6, are diagrams of circuits to which my invention may be applied.

Referring to Fig. 1, a converter, 1, is here shown as having a negative electrode, 2, and three positive electrodes, 3, 4 and 5, the latter being respectively connected to the terminals, 6, 7 and 8, of a three-phase generator or transformer having a star winding. The negative electrode 2 is connected to the neutral point, 9, of the said generator or transformer through a work circuit 10, 11. As here shown, a storage battery or accumulator, 12, is connected between the main conductors 10 and 11 of the receiving circuit, and a choke coil or inductance, 13, is interposed in the conductor 11.

It is known that a source of supply delivering three-phase currents to a vapor converter of the character illustrated will send through the converter currents of one direction only, such currents passing successively to the negative electrode 2 from the positive electrodes 3, 4 and 5. Impulses of opposite direction cannot pass through the converter owing to the property possessed by apparatus of this sort of introducing an initial reluctance to starting, which reluctance appears mainly at the negative electrode. Accordingly if, through any suitable instrumentality a starting current be applied to the converter of sufficiently high potential to break down the initial reluctance at the electrode 2, currents will not pass in the opposite direction unless by other starting means the reluctance is broken down at one or the other of the electrodes 3, 4 and 5. When, however, current has once been caused to pass through a converter connected with a three-phase source as herein shown, the succeeding impulses, overlapping in time, follow each other with sufficient rapidity so that without any separate starting device, and without any special means for maintaining current in the selected direction, such as I sometimes employ with other types of generator, the reluctance at the electrode 2 is not reconstructed before a succeeding impulse in the proper direction passes through the converter.

In Fig. 1 the work circuit is intended to store energy in the storage battery or accumulator 12. The office of the inductance or choke coil 13 is that of preventing too great a rush of current to the storage battery when the impulses from the three-phase generator are at the top of the wave and of preventing an excessive lowering of the applied electro-motive-force when the successive impulses are at the minimum of the wave. The battery cannot discharge in opposition to the applied electro-motive-force owing to the fact that current will not pass in a reverse direction through the converter 1.

Referring once more to the action of the choke coil or inductance it is evident that during a period of increasing current from one of the terminals of the generator, energy is stored in the choke coil and also that, should there be any tendency for the energy applied to the terminals of the storage battery to create a rush of current when the impulse approaches and reaches the top of the wave (as when the supply is operating on a fully discharged or weakly charged storage battery) the choke coil will prevent an excessive flow of current, thus acting to steady the operation of the system during the period of increasing current. It is also evident that during the times of decreasing current, succeeding the described increase, the energy stored in the choke coil will be discharged in such direction as to maintain the current through the converter more nearly at the uniform value. The choke coil or inductance thus becomes a regulating and steadying force in the system.

In Fig. 2 the same principle is broadly applied, but the steadying device is here a storage battery, 14, to which current is supplied from a dynamo, 15, which may be a direct current dynamo if desired, connected with the work circuit, 16, 17, through a current arrester, 18, having one positive and one negative electrode. We may assume that the dynamo 15 is driven by a wind mill or other source of varying power. The work circuit may contain translating devices, 19, 20, of any suitable character. During the periods when the generator is operating under steady conditions impulses of one direction will pass through the current arrester 18 and the battery 14 will be charged. When power applied to the generator 15 fluctuates or the supply delivered by the said generator falls for any reason, below a normal limit, the storage battery will discharge itself through the work circuit and bridge over the periods of low supply.

In Fig. 3 the steadying device is represented as a shunt wound motor 21, and the translating devices, 22, are shown as lamps of the Cooper Hewitt type. The action is similar to that of the system illustrated in Fig. 2.

Fig. 4 illustrates another application of the principle of this invention. Between the mains 10, 11 of the alternating current supply circuit the primary 23, of a transformer is placed and in series with it a resistance or inductance 24. The work circuit 16, 17 may supply incandescent lamps 25, 25, or other translating devices. The primary 23 is provided with a secondary 26, and 27 is an adjustable resistance parallel to the primary. One terminal of the secondary 26 is connected to the conductor 11, and the other terminal is joined to a band or strip, 29, constituting what is usually called a starting band in connection with apparatus of this class. The function of the starting band in connection with the current applied thereto appears to be that of creating an electrical strain in the neighborhood of the negative electrode, such strain tending to break down the initial electrode reluctance. When such strain is sufficiently reinforced by a current applied to the negative electrode itself, the breaking down occurs and current flows through the apparatus. In the present instance, the application of a critical strain through the medium of the starting band is so adjusted by means of the resistance 24 and the adjustable resistance 27 as to control the acceleration or retardation of the secondary electro-motive-force so as to predetermine the moment when the critical strain is applied to the converter. By means of the described devices the starting of the converter, and consequently the delivery of current to the receiving circuit, may be made at any point in a cycle, whereby the energy delivered to the receiving circuit will be subject to control. This follows from the circumstances that the converter will not carry current of a given phase beyond the zero point of the wave, after which the apparatus requires to be started again before current will be transmitted. Such is the normal operation of the apparatus. But when a choke coil or inductance, as 30, is included in the circuit, its action is to maintain the current beyond the momentary drop to the zero or minimum point, whereby approximate steadiness is secured.

In Fig. 5, I show the primary 31 of a transformer, having its terminals connected with any suitable source of single phase alternating current. The secondary, 32, of the transformer is connected at its middle point through a choke coil or inductance, 33, with the negative electrode of a vapor lamp or converter. The outer terminals of the secondary are connected to two positive electrodes, 34 and 35, inside the containing vessel of the converter. The successive rises of potential in the secondary circuit store energy in the choke coil 33 which is discharged on a fall of potential in such direction as to maintain a flow of current through the converter or lamp, as the case may be. In case the device is used as a converter, a work-circuit may be introduced in the conductor containing the device 33.

In Fig. 6, a vapor lamp, 36, is shown as being connected to conductors, 37 and 38, leading from a source of direct current. A choke oil, 39, is interposed in the conductor 37, leading to the positive electrode, 40, of the lamp. The energy stored in the choke coil 39 during the normal operation of the lamp is utilized when a fall of potential intervenes to supply to the terminals of the lamp energy in the proper direction for maintaining a flow of current therethrough. It is found that when a lamp of the character illustrated in Fig. 6 is running on a direct current circuit, sudden fluctuations are liable to occur which are sufficient to carry the voltage on the line to a point sufficiently low to permit the extinction of the lamp. Such fluctuations, which might not be observed with other types of illuminant, therefore require to be specially guarded against when using vapor lamps.

In a divisional application bearing the

Serial Number 168,985, filed August 10th, 1903, claims are made upon the apparatus described herein.

I claim as my invention:

1. In a system of electrical distribution comprising a single phase alternating source, a direct current work circuit, a mercury rectifier therefor and a reactance operating at double frequency connected between said source and the cathode of said rectifier whereby said rectifier is kept alive.

2. In a system of electrical distribution comprising a single phase source, a direct current work circuit and a vapor rectifier, means for rendering continuous the operation of said rectifier, said means consisting of a reactance energized at a frequency double that of said source.

3. In a system of electrical distribution the combination with a single phase source, of a direct current work circuit, a mercury vapor rectifier including two anodes and a cathode, connections from said anodes to the mains of said source and a single inductance connected between said cathode and an intermediate point of said source and in series with said work circuit, said inductance operating at double frequency and serving to prevent the extinguishment of operation in said rectifier in zero periods of the source.

4. In a system of electrical distribution comprising a single phase alternating source, a vacuum electric device connected thereto and a reactance operating at double frequency connected between said source and the cathode of said device, whereby said device is kept alive.

5. In a system of electrical distribution comprising a single phase alternating source, a vapor electric device connected thereto and a reactance operating at double frequency connected between said source and the cathode of said device, whereby said device is kept alive.

Signed at New York, in the county of New York, and State of New York, this 13th day of March, A. D. 1903.

PETER COOPER HEWITT.

Witnesses:
WM. H. CAPEL,
GEORGE H. STOCKBRIDGE.